INVENTORS.
ROBERT C. CURRY
CARL G. SHOOK
BY W. J. Shanley Jr.
ATTORNEY

3,102,255
INHIBITOR CIRCUIT

Robert C. Curry and Carl B. Shook, Rochester, N.Y., assignors to General Dynamics Corporation, Rochester, N.Y., a corporation of Delaware Filed July 12, 1960, Ser. No. 42,317
8 Claims. (Cl. 340—146.2)

This invention relates to inhibitor circuits and more particularly to dynamic pulse-operated inhibitors which are useful in data handling and computing systems. In such systems, it is often necessary, as part of the data handling or computing operations, to compare data present in different registers or storage devices and, upon the completion of the comparison operation, to generate a pulse whenever there is a lack of identity between the data present in the different registers. This pulse is thereafter utilized to inhibit or prevent some later operation because of the lack of identity between the compared data. The data stored in registers is usually manifested by the static potentials upon a plurality of individual conductors which are connected to selected points in the register. Thus, by sensing the static potentials simultaneously available upon these conductors a parallel manifestation of the data present in the register is obtained.

Inhibitor circuits are also utilized in the logic circuitry of data handling or computing devices. Such circuits usually take the form of a gating network having a plurality of inputs and a single output to provide an output pulse when less than all of the inputs are energized. Whether these inhibitors were operated directly by the control pulses being sensed, or whether the control information was in the form of static potentials with the inhibitor being operated by utilizing clock pulses, these devices required a large number of diode gates especially where a large number of input potentials are to be sensed.

Comparators of the prior art which performed an inhibiting function when there was a lack of identity between the data present in registers are also usually quite expensive and complex.

It is, therefore, an object of this invention to provide an inhibiting comparator which is extremely simple and inexpensive, yet is rugged and reliable.

It is a further object of this invention to provide a new and improved inhibit gate which is simple and inexpensive, yet is rugged and reliable.

It is a further object of our invention to provide an inhibiting comparator which utilizes delay lines.

It is still a further object of our invention to provide an inhibit gate which utilizes delay lines.

According to the invention, an inhibiting comparator for digital data is characterized in that two pieces of data hereinafter referred to as "words," is applied to two input devices positioned at opposite ends of a delay line and the words are compared upon their arrival at an output device that is located equidistant between the two input devices.

According to one form of the invention, the words are simultaneously applied in parallel at opposite ends of the delay line so that a series of impulses are induced in each end of the delay line. These impulses which are representative of the words to be compared, sequentially arrive at the output device in timed relationship so that the impulses generated by corresponding bits of the words are compared. Thus, the two words are sequentially compared bit by bit. If there is coincidence between the data in both words, no output pulse will be obtained when the impulses are properly polarized so that coincidence of impulses at the output device results in their cancellation.

Another form of the invention is useful as an N input inhibit gate. In this form of the invention a first input device which is located at one end of the delay line, is energized by a clock pulse and generates an impulse N times the magnitude of an impulse generated by an individual one of the N controlled input devices all of which are located at the opposite end of the delay line. The two generated impulses will cancel out upon arrival at the interposed output devices, when all N input devices are operated and the impulses have been properly polarized. This is possible because of the equal spacing of the first input device and the N input devices from the output device.

The basic principles underlying the invention and the manner in which the latter may be carried into practical effect will be understood from the following more detailed description taken with reference to the accompanying drawings, in which.

Figure 1:
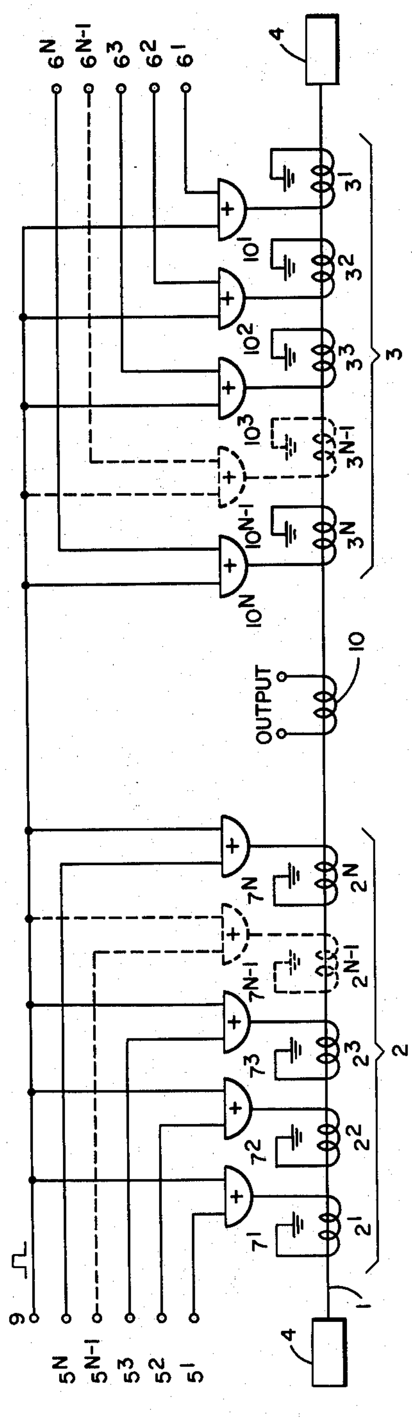
FIG. 1 is a schematic circuit diagram of one arrangement according to the invention.

Referring now to FIG. 1, the comparator disclosed comprises a length 1 of nickel wire having electromagnetically coupled to its two "input" ends two groups of input devices or coils indicated generally at 2 and 3. The length of wire 1 is such as to provide sufficient space for both input devices having in mind the accommodation of the largest word to be handled, as well as the output device. Wire 1 is suitably terminated at each end by supports 4 in any well known manner so as to suppress end reflections. Although wire 1 is shown as a single conductor, it is recognized that a plurality of these wires, joined together in a bundle and suitably tapered at each end so as to minimize end reflections, could also be used.

The N bits of data that form the first word are represented by the static potentials present on the N input terminals, designated $5^1$, $5^2$, $5^3$, $5^{N-1}$ and $5^N$, which are respectively applied to input coils $2^1$, $2^2$, $2^3$, $2^{N-1}$ and $2^N$ by "and" gates $7^1$, $7^2$, $7^3$, $7^{N-1}$ and $7^N$. Such static potentials indicate the conductive condition, i.e., the "on" or "off" condition of corresponding stages of the register. Thus, the two static conditions which the terminals are capable of assuming may be said to be a "1" condition or "0" condition. Since the coils of input device 2 are positioned at equal spaced-apart points along wire 1, an impulse train of equally spaced impulses will be simultaneously induced in wire 1, due to its magnetostrictive properties when a clock pulse is applied to terminal 9. Thus, when an input terminal is at a potential representative of the "1" condition, the corresponding input coil will be pulsed upon the application of a clock pulse to terminal 9 thereby inducing a sonic impulse which is propagated in the direction towards output device 10. However, when an input terminal is in its "0" condition, the corresponding gate will not operate upon the application of the clock pulse. Thus no impulse will be generated by the corresponding coil.

The second word which is present upon input terminal 6 is impressed upon the other end of wire 1 in exactly the same manner as was hereinbefore explained with respect to the first word by utilizing gates $10^1$—$10^N$ as controlled by the clock pulses on terminal 9. Input coils $3^1$—$3^N$ are also located at equal spaced-apart points along the other end of wire 1, these spaced-apart points being positioned with respect to output coil 10 such that corresponding coils of each input coupling device are spaced an equal distance from output coil 10. In this way, sonic impulses generated by corresponding input coils of the input devices arrive simultaneously at output coil 10. By properly polarizing the coils of input coupling devices 2 and 3 with respect to the field present at each input coil, sonic impulses which arrive simultaneously at output coil 10 will cancel and consequently no output pulse will be generated by coil 10.

Since a magnetostrictive material, such as nickel, is not sensitive to changes in polarity of the magnetic field applied but is only sensitive to relative changes in magnitude of the field, it is necessary to provide magnetic biasing for wire 1 at points within the coils of both input coupling devices. This field may be provided by small permanent magnets associated with the input coils, solenoids or may be the remanent magnetization of the wire itself. For the sake of simplicity, it is assumed that wire 1 in FIGS. 1 and 2 have areas of remanent magnetization within both input coupling means and output coupling coil 10. Referring now to FIG. 1, cancellation of two impulses is provided by polarizing the input coils of one input coupling device so as to reduce the field applied to the portion of wire 1 within the coils, upon the application of a pulse, while the coils of the other input coupling device are polarized so that they add to the remanent magnetization of the portion of the wire within the corresponding coils. Thus, when a clock pulse is applied to both input devices the field linking wire 1 within one device decreases while the field linking the portion of wire 1 within the other input device increases. Thus, impulses of equal magnitude will cancel at the output winding. Impulses of equal magnitude are provided by the coils of each input coupling device since each coil is identical and are connected to a common pulsing source i.e., the clock pulses applied to input terminal 9.

Figure 2:
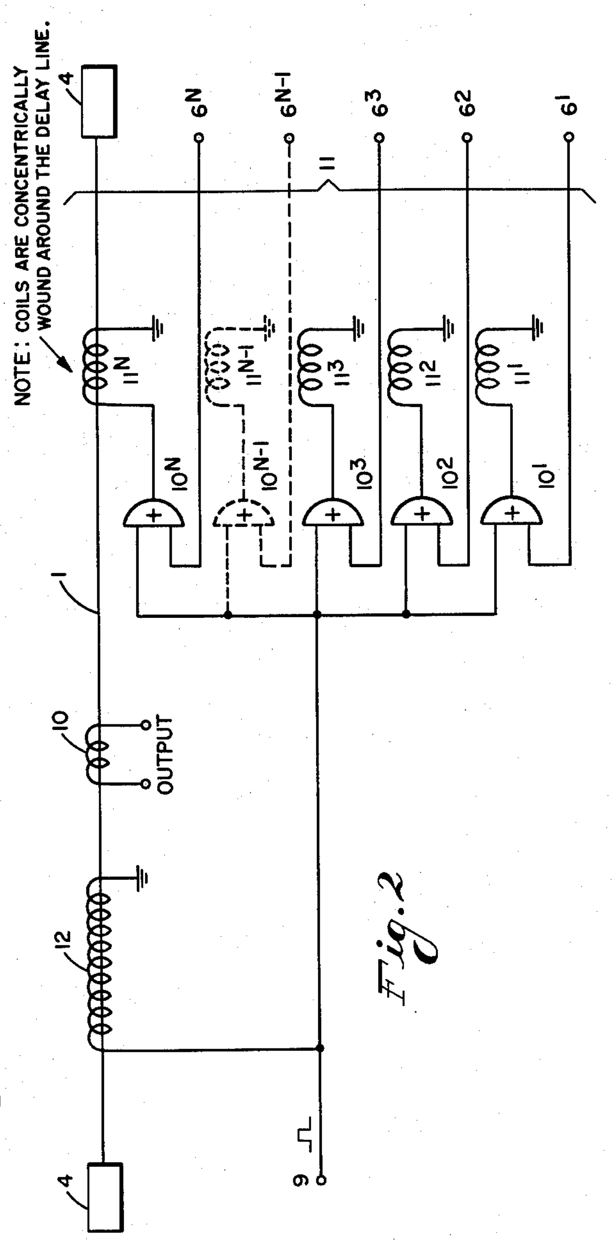
FIG. 2 is a schematic diagram of another such arrangement.

Referring now to the inhibit gate of FIG. 2, wherein elements corresponding to elements disclosed in FIG. 1 bear like reference in numerals, the N control potentials which are applied to terminals $6^1$—$6^N$ are applied to input coils $11^1$—$11^N$ through "and" gates $10^1$—$10^N$. Since coils $11^1$—$11^N$ are equal in size and are concentrically wound in an additive manner around wire 1, they will collectively generate a sonic impulse the magnitude of which will be directly proportional to the number of operated gates. Since an individual gate will only be operated when its control input is connected to a terminal which is in its "1" condition, the magnitude of the impulse generates by $11^1$—$11^N$ will be directly proportional to the number of control input terminals that are in their "1" condition. Input coil 12 provides means for generating a sonic impulse the magnitude of which is N times the magnitude of an impulse generated by an individual coil of input device 11 when they are operated by clock pulses of equal magnitude. Due to the common connection of clock pulse input terminal 9 to input devices 11 and 12, sonic impulses will be simultaneously generated at both ends of wire 1 and will travel toward output coil 10 which is positioned equidistant from the input devices. Cancellation of these impulses will only occur when all N of input terminals $6^1$—$6^N$ are in their "1" condition, thus providing the inhibiting action. As was hereinbefore pointed out, in order to have impulse cancellation at output coil 10, the coils must be oppositely polarized with respect to the fields of wire 1 present at the corresponding input device. It can be seen that there will only be partial cancellation if less than all of the input terminals are in their "1" condition since the two impulses will then be of unequal magnitude. This will result in inducing a voltage in coil 10 which can be utilized to perform the desired inhibiting action.

Figures 3, 4:
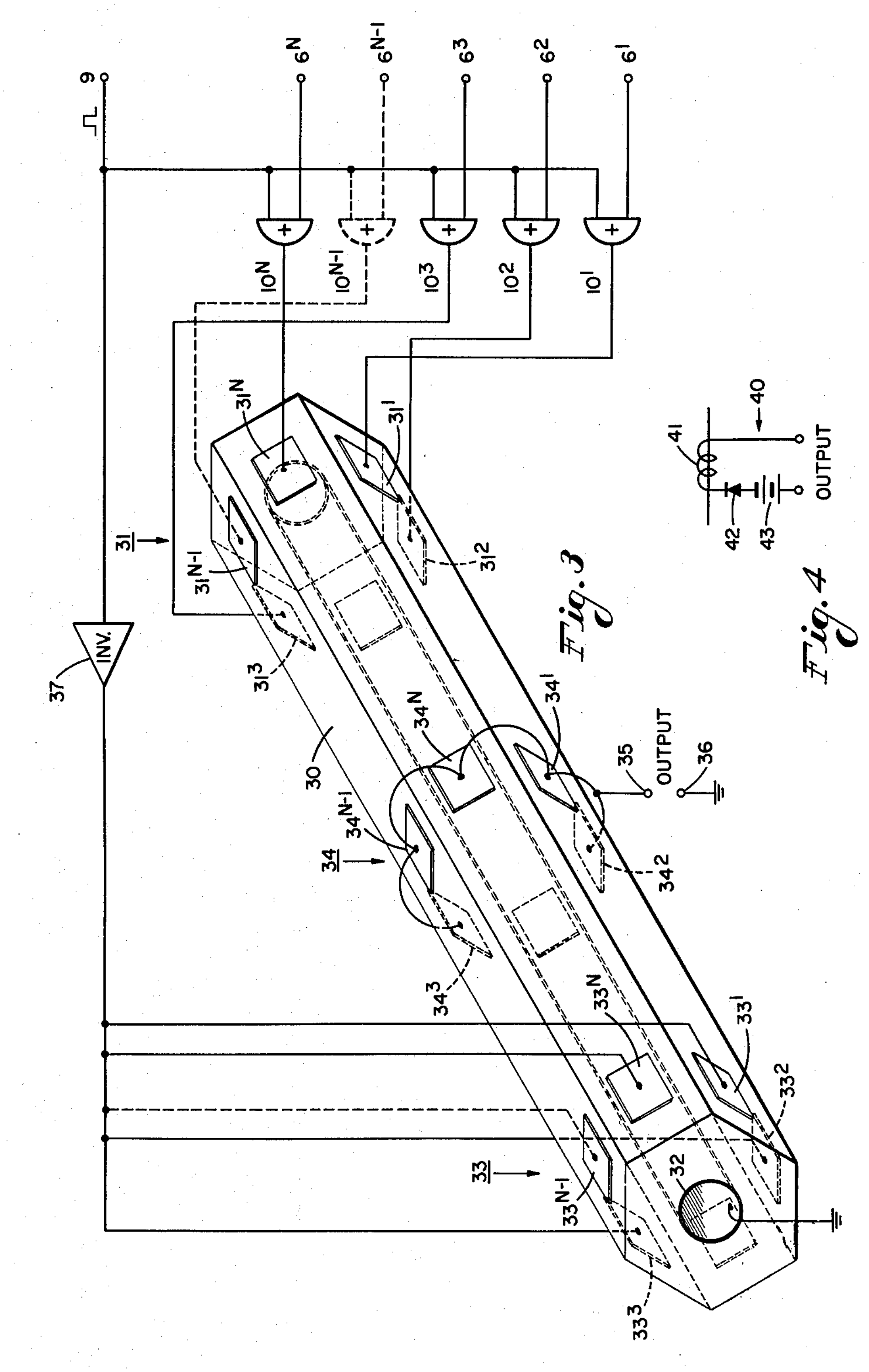
FIG. 3 is a schematic diagram of still another such arrangement.
FIG. 4 is a schematic diagram of an output circuit useful with the arrangements disclosed in FIG. 1.

Referring to FIG. 3, which discloses an electrostrictive inhibit gate, the delay line 30 is shown to be a multisided tube of electrostrictive material such as barium titanate. Tube 30 may be tapered at its ends and loaded with some type of absorbent material in order to produce out-ofphase reflection characteristics, which minimize the result of end reflections and dampens these reflections. There is disposed on each side of delay line 30 a plurality of silver-plated areas or capacitor plates which, in conjunction with the coated inner surface 32, operates as a plurality of capacitors with an electrostrictive dielectric. The first group of capacitor plates $31^1$—$31^N$ which form in conjunction with coated area 32, input device 31, are respectively connected to control input terminals $6^1$—$6^N$ through "and" gates $10^1$—$10^N$. The other group of capacitor plates $33^1$—$33^N$ which form in conjunction with coated surface 32, input device 33 is connected in common to clock-pulse input terminal 9. Input terminal 9 is also connected in common to the clock-pulse input terminals of gates $10^1$—$10^N$ for simultaneously operating gates connected to control input terminals that are in their "1" condition. Capacitor plates $34^1$—$34^N$ in conjunction with coated surface 32 comprise output device 34 which is located equidistant between input devices 31 and 33. Means is provided for connecting in common plates $34^1$—$34^N$ to output terminal 35, output terminal 36 being connected to ground.

Since the individual capacitor plates of input devices 31 and 33 are of equal size, input device 33 will generate an impulse in delay line 30N times the magnitude of an impulse generated by an individual one of capacitor plates of group $31^1$—$31^N$. Thus, if less than all of input terminals $6^1$—$6^N$ are in their "1" condition, the impulse generated by input device 31 will be of a lesser magnitude than that generated by input device 33. Consequently, complete cancellation will not take place upon arrival at output device 34 and, consequently, an output pulse will be generated which will appear across terminals 35 and 36.

An electrostrictive ceramic material, such as barium titanate, is also non-polarity sensitive in the same manner as a magnetostrictive material; consequently, in order to obtain cancellation at output device 34 between impulses of equal magnitude, it is necessary to polarize the input pulses applied to the two input devices in opposite directions when the material has an internal remanent radial polarization of the same direction at both input devices. In order to obtain pulses, the material also should have a remanent radial polarization at the output device. It is recognized that the electric bias at the input and output devices could be provided by suitably connecting external batteries to the devices. However, for the sake of simplicity, the bias is illustrated as being provided by remanent internal polarization. Thus, inverter 37 is connected between clock-pulse input terminal 9 and input device 33 to provide the necessary inversion of the clock-pulse. Thus, it can be seen that the resulting N input inhibit gate which utilizes electrostrictive delay line 30, operates in essentially the same fashion as the inhibit gate of FIG. 2 which utilizes a magnetostrictive delay line.

It is further noted that an electrostrictive delay line could be substituted for the magnetostrictive delay line of FIG. 1 without departing from the spirit or scope of this invention.

It is further noted that by changing the polarization of the coils of one input device of the embodiment of FIG. 2 so that the devices would be polarized in the same direction with respect to their corresponding field, the gate would then operate as an N input "and" gate if the output device of FIG. 4 were substituted for output device 10. This would occur since the polarization of the input devices would be such as to result in the addition of the impulses upon their arrival at the output device instead of their cancellation. With such a device, the presence upon each of the N input terminals of potentials representative of their "1" condition will result in the formation of an impulse of 2N magnitude at output device 40. Output device 40 is comprised of output coil 41, diode 42 and battery 43. Diode 42 which is back-biased by battery 43 is provided to prevent the generation of an output pulse except when all N input terminals are in their "1" condition. Diode 42 is polarized with respect to winding 41 so that pulses induced in winding 41 will bias the diode in a forward direction. Battery 43 provides a D.C. bias for diode 42 which can only be overcome by the application of an impulse of 2N magnitude.

It is felt to be obvious due to the foregoing discussion how the electrostrictive inhibit gate disclosed in FIG. 3 may be converted into an N input "and" gate.

Although the invention has been described with respect to the comparison or gating of information which is represented by static potentials, it is recognized that the invention is not limited to being used in such systems. It is obvious that the invention is equally applicable to systems in which the control potentials or data to be compared is available as pulse trains presented in parallel form. If such is the case, it is obvious that the "and" gates associated with each input coupling device of the comparator of FIG. 1 could be dispensed with and the parallel pulse information could be simultaneously read into the input coils of each input device. In like manner, the gating of the arrangements of FIG. 2 and FIG. 3 could also be dispensed with if pulses of the required timing were available.

While we have described above the principles of our invention, in connection with specific apparatus, it is to be clearly understood that this description is made only by way of example and not as a limitation on the scope of our invention as set forth in the objects thereof and in the accompanying claims.

What is claimed is:

1. A comparator comprising an elongated body of material capable of transmitting therealong an impulse produced therein, first input coupling means comprising N input devices located at a first given point, each of said devices being capable of producing an impulse of a given magnitude in response to the application of an electrical pulse of a given magnitude, second input coupling means comprising an input device located at a second given point, said input device being capable of producing an impulse N times said given impulse magnitude in response to the application of an electrical pulse of said given magnitude, an output device located equidistant from said first and second fixed points for producing an electrical pulse in response to the passage of an impulse and means for applying electrical pulses to said input device and said N input devices.

2. The combination of claim 1 in which said body of material is magnetostrictive and each of said devices comprises a coil magnetically coupled to said body of material.

3. The combination of claim 2 in which said pulse applying means comprises data input circuit means, means for preparing energizing circuits for said N input coils in accordance with the data applied to said input circuit means and means for simultaneously energizing said prepared energizing circuits for the input coils and the input coil of said second coupling means.

4. The combination of claim 3 in which said data input circuit means comprises N input conductors to which input data is applied, and said energizing means comprises N two-input "and" gates, the outputs of which are individually connected to energize corresponding ones of said N input coils, the first input of each of said gating means being individually connected to corresponding ones of said N input conductors, the second input of each of said gating means being connected in common to said input coil of said second coupling means.

5. The combination of claim 1 in which said body of material is electrostrictive and each of said N devices is a capacitor, each capacitor comprising a capacitor plate positioned adjacent said body, said body having a conductive layer on the side of said body opposite said plate, said input device of said second coupling means comprises N capacitors each comprising a capacitor plate positioned adjacent said body, said body having a conductive layer on the side of said body opposite said conductive layer.

6. The combination of claim 5 in which said pulse applying means comprises data input circuit means, means for preparing an energizing circuit for each capacitor of said N devices in accordance with the data applied to said input circuit means and means for simultaneously pulsing said N capacitors of said input device and the capacitors of said N devices having a prepared energizing circuit.

7. The combination of 6 in which said data input circuit means comprises N input conductors to which input data is applied, and said energizing means comprises N two-input "and" gates, the outputs of which are individually associated with corresponding capacitors of said N devices, the first input of each of said gating means being individually connected to corresponding ones of said N input conductors, the second input of each of said gating means being connected to be pulsed in common with said N capacitors of said input device.

8. The combination of claim 7 in which said connection to pulse said gating means and said N capacitors in common comprises means to polarize the pulses applied to said N capacitors oppositely to the pulses applied to said gating means whereby impulse cancellation will occur at said output device when all the capacitors of said N devices are pulsed.

References Cited in the file of this patent

UNITED STATES PATENTS

| | | |
|---|---|---|
| 2,736,881 | Booth | Feb. 28, 1956 |
| 2,845,220 | Bensky et al. | July 29, 1958 |
| 2,959,768 | White et al. | Nov. 8, 1960 |